(12) United States Patent
Yang et al.

(10) Patent No.: US 12,513,267 B2
(45) Date of Patent: Dec. 30, 2025

(54) PROJECTION DISPLAY DEVICE

(71) Applicant: DELTA ELECTRONICS, INC., Taoyuan (TW)

(72) Inventors: Chung-Yi Yang, Taoyuan (TW); Chui-Fan Chiu, Taoyuan (TW)

( * ) Notice: Subject to any disclaimer, the term of this patent is extended or adjusted under 35 U.S.C. 154(b) by 0 days.

(21) Appl. No.: 18/771,271

(22) Filed: Jul. 12, 2024

(65) Prior Publication Data

US 2025/0274570 A1    Aug. 28, 2025

(30) Foreign Application Priority Data

Feb. 23, 2024   (CN) .......................... 202410201588.0

(51) Int. Cl.
*H04N 9/31* (2006.01)
*H04N 13/363* (2018.01)
*H04N 13/398* (2018.01)

(52) U.S. Cl.
CPC ......... *H04N 9/3188* (2013.01); *H04N 9/3155* (2013.01); *H04N 13/363* (2018.05); *H04N 13/398* (2018.05)

(58) Field of Classification Search
CPC .. H04N 9/3188; H04N 9/3155; H04N 13/363; H04N 13/398
USPC ........................................................ 348/51
See application file for complete search history.

(56) References Cited

U.S. PATENT DOCUMENTS

| | | | |
|---|---|---|---|
| 9,582,852 B2 | 2/2017 | Wallace et al. | |
| 9,848,248 B2 | 12/2017 | Chung et al. | |
| 10,798,354 B2 * | 10/2020 | Yang | H04N 9/3188 |
| 11,128,844 B2 * | 9/2021 | Su | H04N 9/3108 |
| 2013/0215103 A1 | 8/2013 | Chiu et al. | |
| 2014/0285483 A1 * | 9/2014 | Yamanaka | G09G 5/393 |
| | | | 345/419 |
| 2014/0340492 A1 | 11/2014 | Abe et al. | |

(Continued)

FOREIGN PATENT DOCUMENTS

CN   204929037 U   12/2015
CN   110312109 B   9/2021

(Continued)

OTHER PUBLICATIONS

Office Action dated May 7, 2025 of the corresponding Japan patent application No. 2024-195062.

(Continued)

*Primary Examiner* — Helen Shibru
(74) *Attorney, Agent, or Firm* — HDLS IPR SERVICES; Chun-Ming Shih

(57) ABSTRACT

A projection display device includes: a receiving unit; a processing control unit electrically connected with the receiving unit; a display imaging unit electrically connected with the processing control unit and generating a display image; a projection light source electrically connected with the processing control unit; and a shifting unit electrically connected with the processing control unit and the display imaging unit. In a first mode, the receiving unit receives one first input image signal, and the shifting unit increases a resolution of the first projection image and projects to a projection screen. In a second mode, the receiving unit receives a plurality of second input image signals, and the shifting unit increases a resolution of the second projection image and projects to a projection screen.

16 Claims, 13 Drawing Sheets

(56) References Cited

U.S. PATENT DOCUMENTS

| | | | |
|---|---|---|---|
| 2016/0360125 A1* | 12/2016 | Yamamoto | G02B 21/365 |
| 2018/0131995 A1 | 5/2018 | Stransky-Heilkron | |
| 2019/0297309 A1 | 9/2019 | Chiu et al. | |
| 2020/0213567 A1 | 7/2020 | Okada et al. | |
| 2021/0343228 A1 | 11/2021 | Lee | |
| 2024/0393874 A1* | 11/2024 | Shi | G09G 5/00 |
| 2025/0157438 A1* | 5/2025 | Luo | G09G 3/007 |

FOREIGN PATENT DOCUMENTS

| | | |
|---|---|---|
| EP | 3905231 A1 | 11/2021 |
| JP | H0983919 A | 3/1997 |
| JP | 20140340492 A1 | 11/2014 |
| JP | 2018004760 A | 1/2018 |
| JP | 20200213567 A1 | 7/2020 |
| TW | 201335920 A | 9/2013 |
| TW | 201707464 A | 2/2017 |
| TW | 201941593 A | 10/2019 |

OTHER PUBLICATIONS

Search Report dated Dec. 20, 2024 of the corresponding European patent application No. 24189765.1.
Office Action dated Oct. 11, 2024 of the corresponding Taiwan patent application No. 113106490.

* cited by examiner

FIG.1C

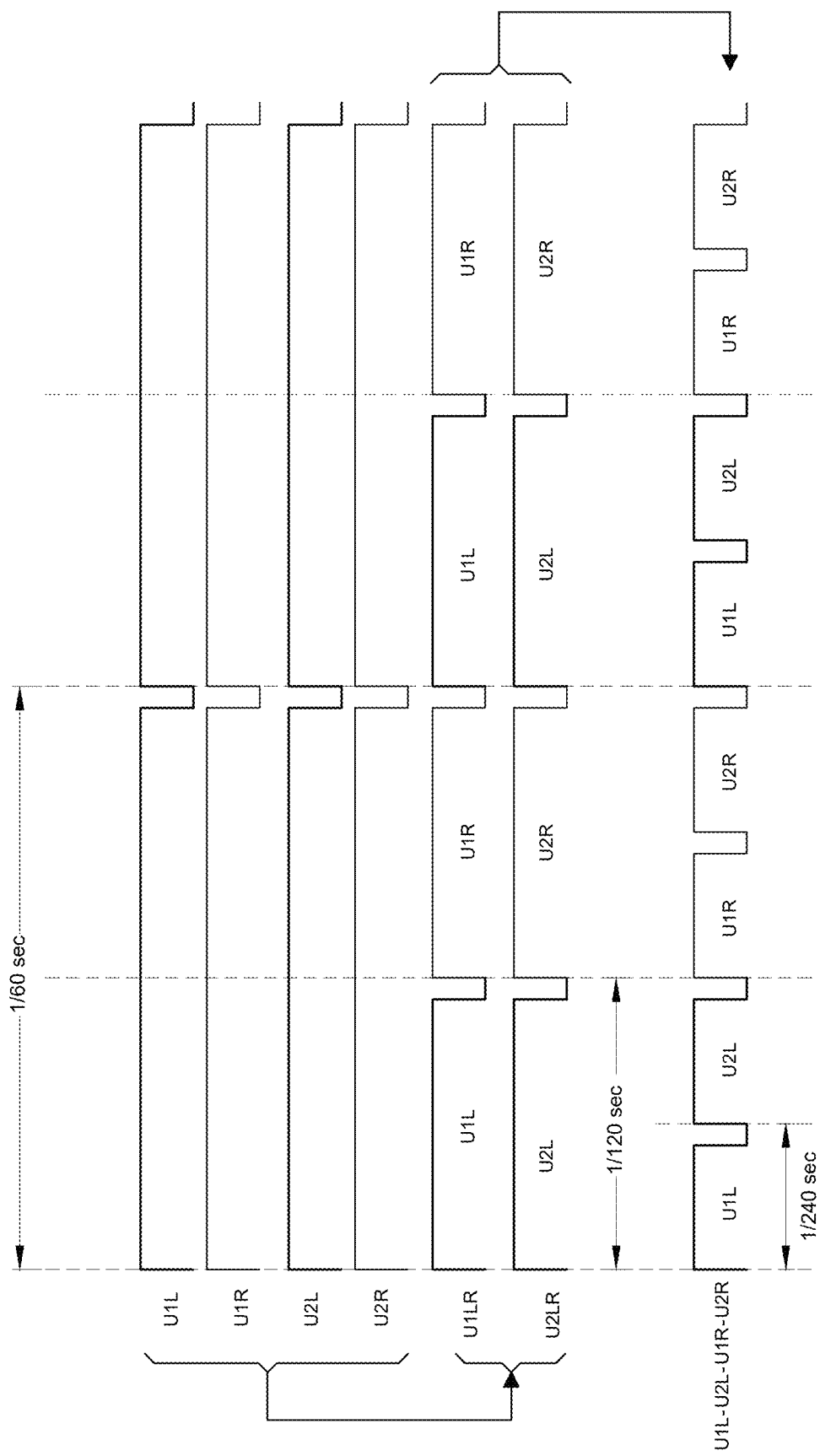

PROJECTION DISPLAY DEVICE

BACKGROUND OF THE DISCLOSURE

Technical Field

The present disclosure relates to a projection display device.

Description of Related Art

The display industry is continuously developing, and the resolution is also continuously increased. The history is, for example, evolving from standard definition (SD, 720×480), full high definition (full HD, 1920×1080), 4 K ultra HD (3840×2160) to 8 K ultra HD (7680×4320). Nowadays, 4 K ultra HD resolution is gradually widespread, and the high level display equipment is capable of achieving 8 K ultra HD resolution. High definition may provide more meticulous pixel information and better image quality.

Further, in order to increase smoothness of playing dynamic pictures, or use the applications, such as fast interactive tracking and mapping, stereoscopic multi-view, etc., high frame rate (HFR) needs to be used. Generally, the frame rate needs to be increased to 240 Hz or 480 Hz.

However, the whole system of the related-art projection device is huge and complicated because the application circuit corresponding to high resolution and high frame rate is included, and the equipment of the related-art projection device is expensive.

In view of this, how to provide a projection display device, which may be flexibly corresponding to different image signals with high resolution and high frame rate and have simpler system and lower cost, is one of the problems that needs to be solved.

SUMMARY OF THE DISCLOSURE

The disclosure provides a projection display device, which may be flexibly satisfied for different image signals with high resolution and high frame rate, and have simpler system and lower cost.

The disclosure provides a projection display device, including: a receiving unit; a processing control unit, electrically connected with the receiving unit; a display imaging unit, electrically connected with the processing control unit, and configured to generate a display image; a projection light source, electrically connected with the processing control unit; and a shifting unit, electrically connected with the processing control unit. In a first mode, the receiving unit is configured to receive one first input image signal and output a first output image signal, the processing control unit is configured to receive the first output image signal and output a first color image signal, a second color image signal, and a third color image signal, the display imaging unit is configured to receive the first color image signal, the second color image signal, and the third color image signal to generate the display image, the display image is transformed to a first projection image through the projection light source, the shifting unit is configured to shift the first projection image based on a control timing and project the first projection image to a projection screen to increase a resolution of the first projection image. In a second mode, the receiving unit is configured to receive a plurality of second input image signals and output a second output image signal, the processing control unit is configured to receive the second output image signal and output the first color image signal, the second color image signal, and the third color image signal, the display imaging unit is configured to receive the first color image signal, the second color image signal, and the third color image signal to generate the display image, the display image is transformed to a second projection image through the projection light source, the shifting unit is configured to shift the second projection image based on the control timing and project the second projection image to the projection screen to increase a resolution of the second projection image.

In some embodiments, a resolution of the first input image signal is greater than a resolution of each second input image signal.

In some embodiments, a refresh rate of the first input image signal is same as a refresh rate of each second input image signal.

In some embodiments, after passing the shifting unit, the resolution of the first projection image is the same as the resolution of the second projection image.

In some embodiments, the receiving unit includes: a plurality of image signal input modules, configured to receive the first input image signal in the first mode, and configured to receive the second input image signals in the second mode; an image signal switching portion, electrically connected with the image signal input modules, and configured to receive the first input image signal or the second input image signals; and an image signal processing portion, electrically connected with the image signal switching portion, and configured to receive the first input image signal or the second input image signals and output the first output image signal or the second output image signal.

In some embodiments, when the image signal processing portion receives the second input image signals, the image signal processing portion is configured to combine the second input image signals to the second output image signal, and a resolution of the first output image signal is same as a resolution of the second output image signal.

In some embodiments, the processing control unit includes: an image signal input port, configured to receive the first output image signal in the first mode, and configured to receive the second output image signal in the second mode; a sub-frame processing portion, electrically connected with the image signal input port, and configured to receive the first output image signal or the second output image signal and output a sub-output image signal; and a color management portion, electrically connected with sub-frame processing portion, and configured to receive the sub-output image signal and output the first color image signal, the second color image signal, and the third color image signal.

In some embodiments, a resolution of the sub-output image signal is less than a resolution of the first output image signal or a resolution of the second output image signal.

In some embodiments, the processing control unit further includes: a system control portion, electrically connected with and configured to control the display imaging unit and the shifting unit.

In some embodiments, in the first mode, the system control portion is configured to receive the first output image signal and output a stereo video synchronous signal, and in the second mode, the system control portion is configured to receive the second output image signal and output the stereo video synchronous signal.

The disclosure provides a projection display device, including: a plurality of receiving units; a plurality of processing control units, electrically connected with the receiving units, respectively; a display imaging unit, electrically connected with the processing control units, and configured to generate a display image; a projection light source, electrically connected with the processing control unit; and a shifting unit, electrically connected with the processing control units. In a first mode, each receiving unit is configured to receive one first input image signal and output a first output image signal, each processing control unit is configured to receive the first output image signal and output a first color image signal, a second color image signal, and a third color image signal, the display imaging unit is configured to receive the first color image signal, the second color image signal, and the third color image signal to generate the display image, the display image is transformed to a first projection image through the projection light source, the shifting unit is configured to shift the first projection image based on a control timing and project the first projection image to a projection screen to increase a resolution of the first projection image. In a second mode, each receiving unit is configured to receive a plurality of second input image signals and output a second output image signal, each processing control unit is configured to receive the second output image signal and output the first color image signal, the second color image signal, and the third color image signal, the display imaging unit is configured to receive the first color image signal, the second color image signal, and the third color image signal to generate the display image, the display image is transformed to a second projection image through the projection light source, the shifting unit is configured to shift the second projection image based on the control timing and project the second projection image to the projection screen to increase a resolution of the second projection image.

In summary, the projection display device of the disclosure may be used corresponding to multiple types of often used image signals with high resolution (8 K/4 K) and high frame rate. The arrangement with more flexibility and better cost performance ratio may be provided by the design of modularizing the receiving unit and the processing control unit. As a result, the disclosure may provide the projection display device, which may have simpler system and lower cost, and may be satisfied for different applications with high resolution and high frame rate.

BRIEF DESCRIPTION OF THE DRAWINGS

FIG. 1A to FIG. 1D are the illustrative diagrams corresponding to different image signal formats.

FIG. 8A to FIG. 8D are the timing transforming diagrams of the stereoscopic vision image signal with 8 K resolution and 120 Hz frame rate for multi-viewer.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

As used in the present disclosure, terms such as "first", "second", "third", "fourth", and "fifth" are employed to describe various elements, components, regions, layers, and/or parts. These terms should not be construed as limitations on the mentioned elements, components, regions, layers, and/or parts. Instead, they are used merely for distinguishing one element, component, region, layer, or part from another. Unless explicitly indicated in the context, the usage of terms such as "first", "second", "third", "fourth", and "fifth" does not imply any specific sequence or order.

First, the projection display device of the disclosure may be cooperated with the image signal source, such as personal computer or fundamental media server (not shown in figures), etc. The media server includes hard disk drive and memory for storing and playing 8 K/4 K media content, and codec for encoding, decoding video image corresponding to the format of media content and image signal output format. The media server may have a plurality of sets of image signal output. For example, the media server may be arranged with a plurality of sets of image signal output ports, and each image signal output port may output the image signal with more than 4 K resolution. The image signal output port may be, for example, HDMI 2.0/2.1, DisplayPort 1.4/2.0/2.1, or 12G SDI, etc., here is not intended to be limiting. The aforementioned media server is exemplary, here is not intended to be limiting.

Further, the projection display device of the disclosure may be used corresponding to multiple types of often used image signals with high resolution (8 K/4 K) and high frame rate. For example, as shown in Table 1 below. It should be noted that Table 1 below is exemplary, here is not intended to be limiting.

TABLE 1

| Type | Image signal type | Amounts of image signal input port |
|---|---|---|
| A | 8K resolution single image signal | 1(8K 60 Hz) |
| B | 8K resolution four square-division image signal | 4(4K 60 Hz) |
| C | 8K resolution 2X2 pixels four-division image signal | 4(4K 60 Hz) |
| D | 8K resolution 120 Hz stereoscopic vision image signal | 2(8K 60 Hz) or 8(4K 60 Hz) |
| E | 4K resolution 120 Hz stereoscopic vision image signal for multi-viewer | 2(4K 60 Hz)/viewer |
| F | 4K resolution 240 Hz image signal | 1(4K 240 Hz) |

Figure 1B:
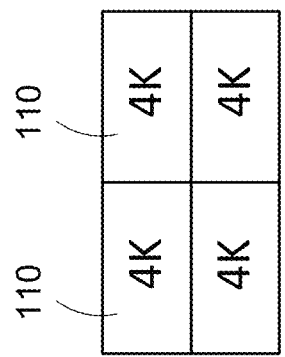
Figure 1A:
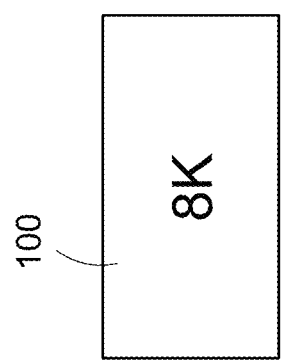

FIG. 1A to FIG. 1D are the illustrative diagrams corresponding to different image signal formats. For example, as shown in FIG. 1A, the 8 K resolution single image signal in type A may be used through outputting 8 K resolution picture signal 100 by single image signal.

For another example, as shown in FIG. 1B, the 8 K resolution four square-division image signal in type B may be used through simultaneously outputting four image signals to be corresponding to one 8 K resolution picture with four 4 K resolution sub-picture signal 110 in square-division.

Figure 1C:
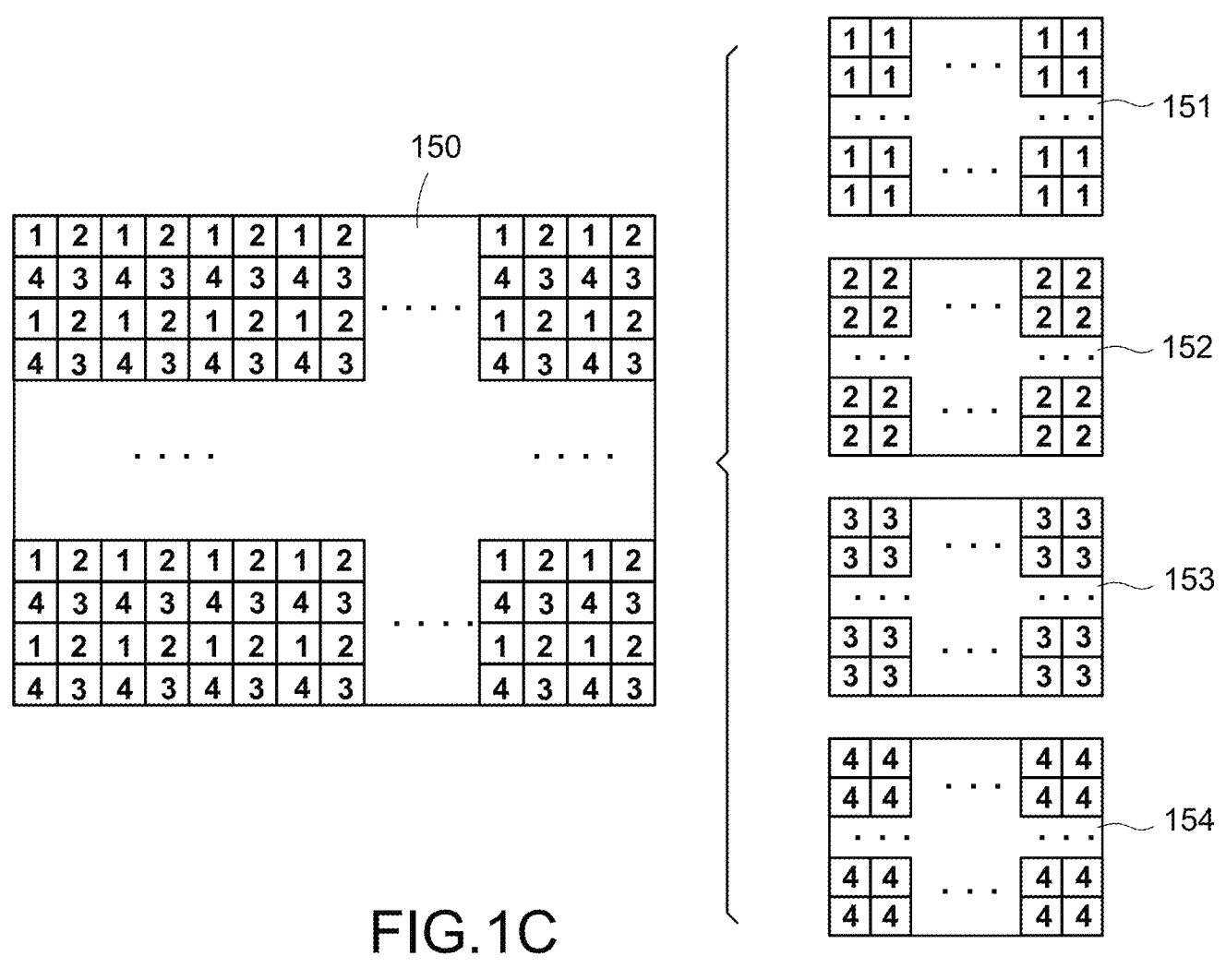

For another example, as shown in FIG. 1C, the 8 K resolution 2×2 pixels four-division image signal in type C may be used through simultaneously outputting four image signals to be corresponding to one 8 K resolution picture with four 4 K resolution pictures 151, 152, 153, 154 in 2×2 pixels four-division. Specifically, the 2×2 pixels four-division manner is to divide and re-arrange the original image 150 with 8 K resolution into four 4 K resolution sub-picture signals 151, 152, 153, 154 according to the pixel arrangement as shown in FIG. 1C.

For another example, the 8 K resolution 120 Hz stereoscopic vision image signal in type D may use two output image signals with 8 K resolution 60 Hz to be corresponding to left-eye picture and right-eye picture of the 8 K resolution stereoscopic vision image. Further, left-eye picture of the 8 K resolution stereoscopic vision image may be corresponding to four square-division 4 K resolution image signals as shown in FIG. 1B, and right-eye picture of the 8 K resolution stereoscopic vision image may also be corresponding to four square-division 4 K resolution image signals as shown in FIG. 1B.

Figure 1D:
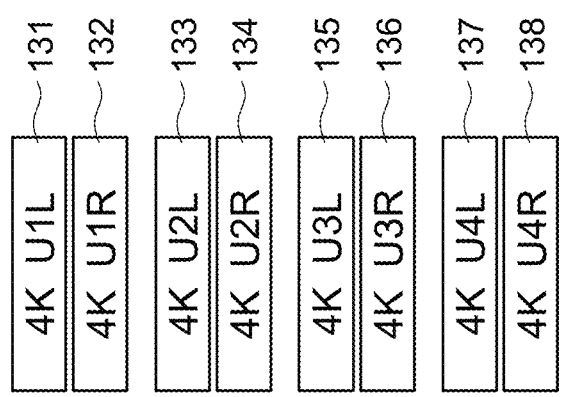

For another example, the 4 K resolution 120 Hz stereoscopic vision image signals for multi-viewer in type E may use, for example, eight output image signals to be corresponding to left-right-eye pictures of stereoscopic vision for the perspectives of four viewers. For example, as shown in FIG. 1D, two output image signals are used to be corresponding to 4 K resolution 60 Hz left-eye picture signal 131 and 4 K resolution 60 Hz left-eye picture signal 132 of the first viewer; two output image signals are used to be corresponding to 4 K resolution 60 Hz left-eye picture signal 133 and 4 K resolution 60 Hz left-eye picture signal 134 of the second viewer at the same time; two output image signals are used to be corresponding to 4 K resolution 60 Hz left-eye picture signal 135 and 4 K resolution 60 Hz left-eye picture signal 136 of the third viewer at the same time; and two output image signals are used to be corresponding to 4 K resolution 60 Hz left-eye picture signal 137 and 4 K resolution 60 Hz left-eye picture signal 138 of the fourth viewer at the same time.

For another example, the 4 K resolution 240 Hz image signal in type F may be used through outputting the high frame rate picture signal with 4 K resolution 240 Hz by single output image signal.

It should be noted that the resolution, frame rate, and output manner of the aforementioned image signals are exemplary, here is not intended to be limiting.

Figure 2:
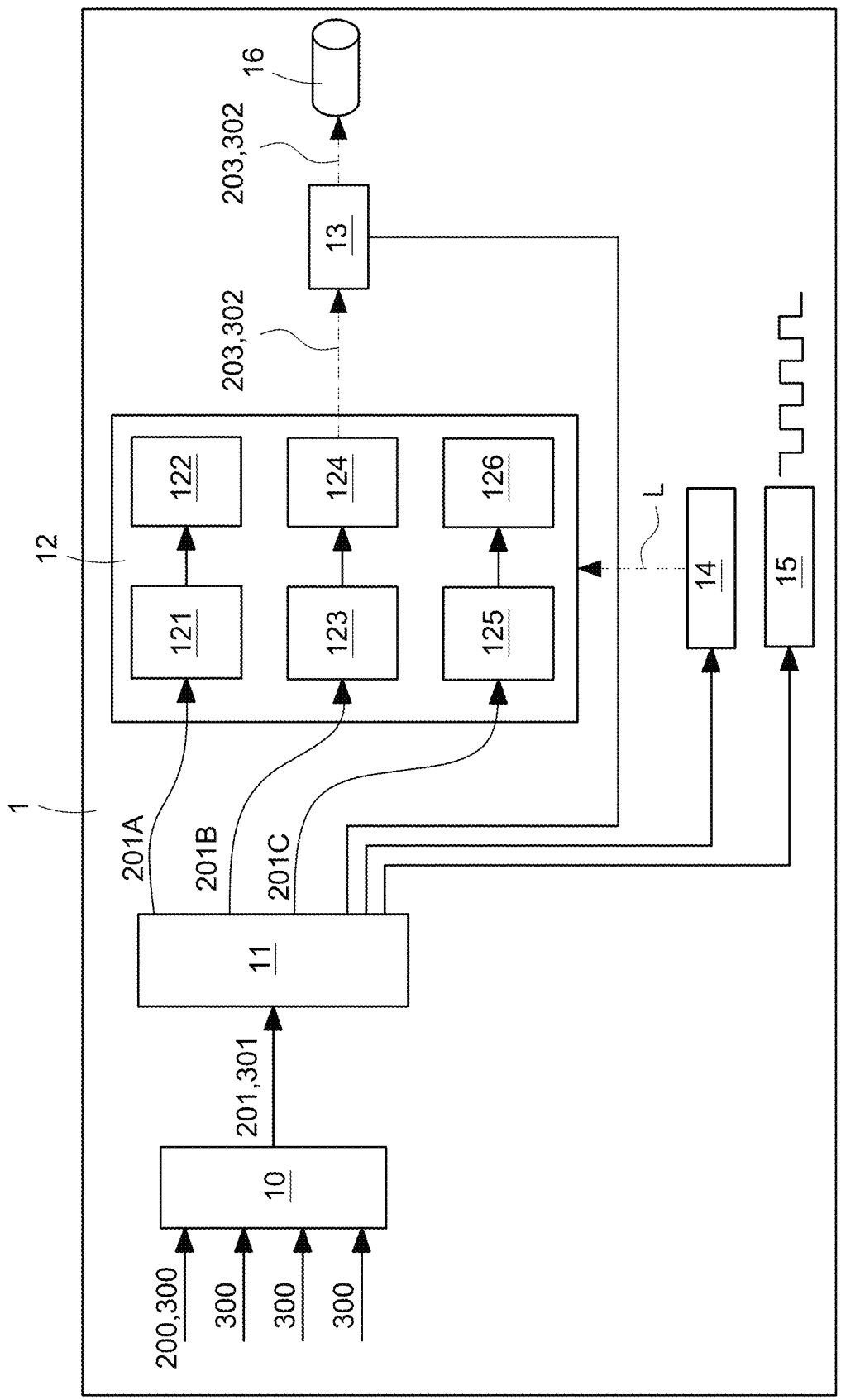
FIG. 2 is the schematic diagram of the first embodiment of a projection display device of the disclosure.

FIG. 2 is the schematic diagram of the first embodiment of a projection display device 1 of the disclosure. The first embodiment of the projection display device 1 of the disclosure includes a receiving unit 10, a processing control unit 11, a display imaging unit 12, a shifting unit 13, a projection light source 14, and a projection lens 16. The processing control unit 11 is electrically connected with the receiving unit 10. The display imaging unit 12 is electrically connected with the processing control unit 11 to generate a display image. The shifting unit 13 is electrically connected with the processing control unit 11. The projection light source 14 is electrically connected with the processing control unit 11. The display image generated by the display imaging unit 12 is transformed to a projection image through the projection light source 14. In other words, the light L projected by the projection light source 14 passes through the display imaging unit 12 to transform the display image into the projection image 203, 302. The projection image 203, 302 passes through the shifting unit 13 and the projection lens 16 to be projected on the projection screen.

In some embodiments, the projection display device 1 may include a stereo video synchronous signal unit 15, here is not intended to be limiting. The stereo video synchronous signal unit 15 is electrically connected with the processing control unit 11.

The receiving unit 10 is, for example, connected with the media server to receive the input image signal 200, 300 (for example, the signal with high resolution and high frame rate as 8 K60 Hz or 4 K240 Hz, or two sets of stereo video image signal as 4 K120 Hz) from the media server. In some embodiments, the receiving unit 10 may include a video processor, such as scaler or field programmable gate array (FPGA), etc. In some embodiments, the receiving unit 10 may perform image signal format processing and adjustment correspondingly, for example, scaling process for resolution, frame rate conversion, image quality adjustment, etc., and output the processed output image signal 201, 301 to the processing control unit 11.

The receiving unit 10 may switch between a first mode and a second mode. In the first mode, the receiving unit 10 receives single first input image signal 200 and outputs the first output image signal 201. In other words, in the first mode, the receiving unit 10, for example, may receive single input image signal 200 with highest resolution or highest frame rate (for example, the 8 K60 Hz signal in the type A or the 4 K240 Hz signal in the type F) and output the first output image signal 201. In the second mode, the receiving unit 10 receives a plurality of second input image signal 300 and outputs the second output image signal 301. In other words, in the second mode, the receiving unit 10, for example, may receive a plurality of sets of input image signal 300 with high resolution or high frame rate (for example, the 4 K60 Hz signal in the type B to type E) and output the second output image signal 301. In other words, in some embodiments, the resolution of the first input image signal 200 is greater than or equal to the resolution of each one of the second input image signal 300, and the frame rate of the first input image signal 200 is greater than or equal to the frame rate of the second input image signal 300.

Figure 3:
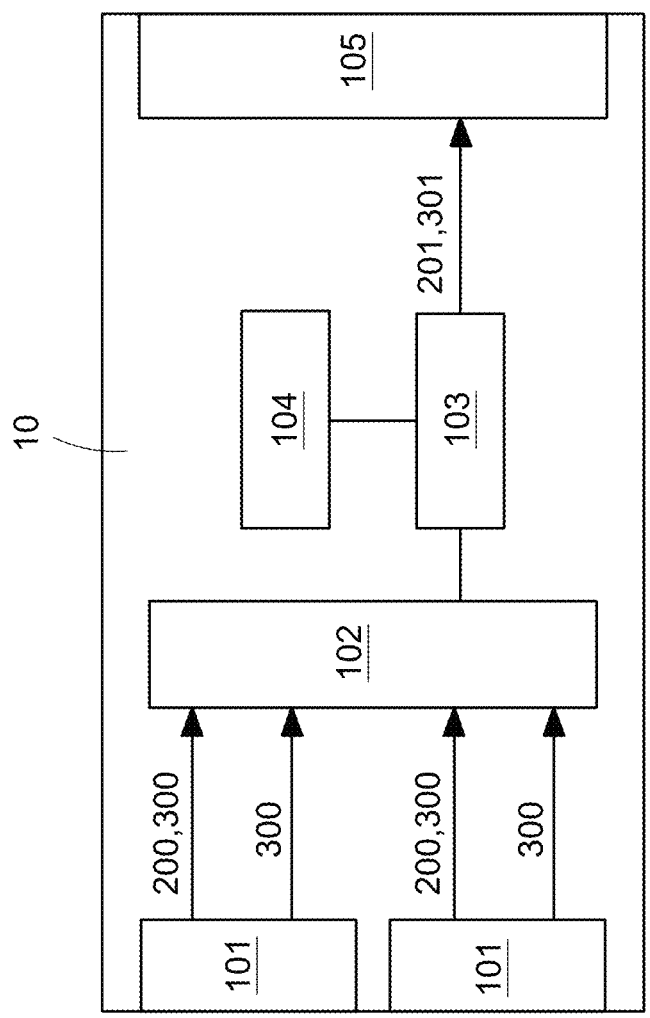
FIG. 3 is the schematic diagram of one embodiment of the receiving unit of the disclosure.

FIG. 3 is the schematic diagram of one embodiment of the receiving unit 10 of the disclosure. As shown in FIG. 3, in some embodiments, the receiving unit 10 may include a plurality of image signal input modules 101, an image signal switching portion 102, an image signal processing portion 103, a memory buffer portion 104, and an output port 105, here is not intended to be limiting. The image signal input modules are used to receive the input image signal 200, 300. The image signal input modules may receive the first input image signal 200 in the first mode, and receive the second input image signal 300 in the second mode. In the present embodiment, two image signal input modules 101 are used as an example, and each image signal input module 101 has two input ports (not shown in figures) for receiving two sets of input image signal. In other words, the receiving unit 10 may receive four sets of input image signal, here is not intended to be limiting. It is worth mentioning that, under the condition of single input image signal 200, one of the two image signal input modules 101 may only be used.

The image signal switching portion 102 is electrically connected with the image signal input modules 101, and receives the input image signal 200, 300. When a plurality of second input image signals 300 is received, the image signal switching portion 102 may switch with respect to the second input image signals 300 and transmit the second input image signals 300 to the image signal processing portion 103 after switching.

The image signal processing portion 103 is electrically connected with the image signal switching portion 102 and the memory buffer portion 104, and receives the input image signal 200, 300. The image signal processing portion 103 and the memory buffer portion 104 may perform signal processing and buffer storing with respect to the input image signal 200, 300. Then, the image signal processing portion 103 outputs the processed output image signal 201, 301 through the output port 105. In some embodiments, when the image signal processing portion 103 receive the second input image signals 300, the image signal processing portion 103 combines the second input image signals 300 into the second output image signal 301. The resolution of the first output image signal 201 is the same with the resolution of the second output image signal 301.

Referring back to FIG. 2, the processing control unit 11 may include central processor, microprocessor, etc. In the first mode, the processing control unit 11 receives the first output image signal 201 and outputs a first color image signal 201A, a second color image signal 201B, and a third color image signal 201C. In the second mode, the processing control unit 11 receives the second output image signal 301 and outputs the first color image signal 201A, the second color image signal 201B, and the third color image signal 201C.

Figure 4:
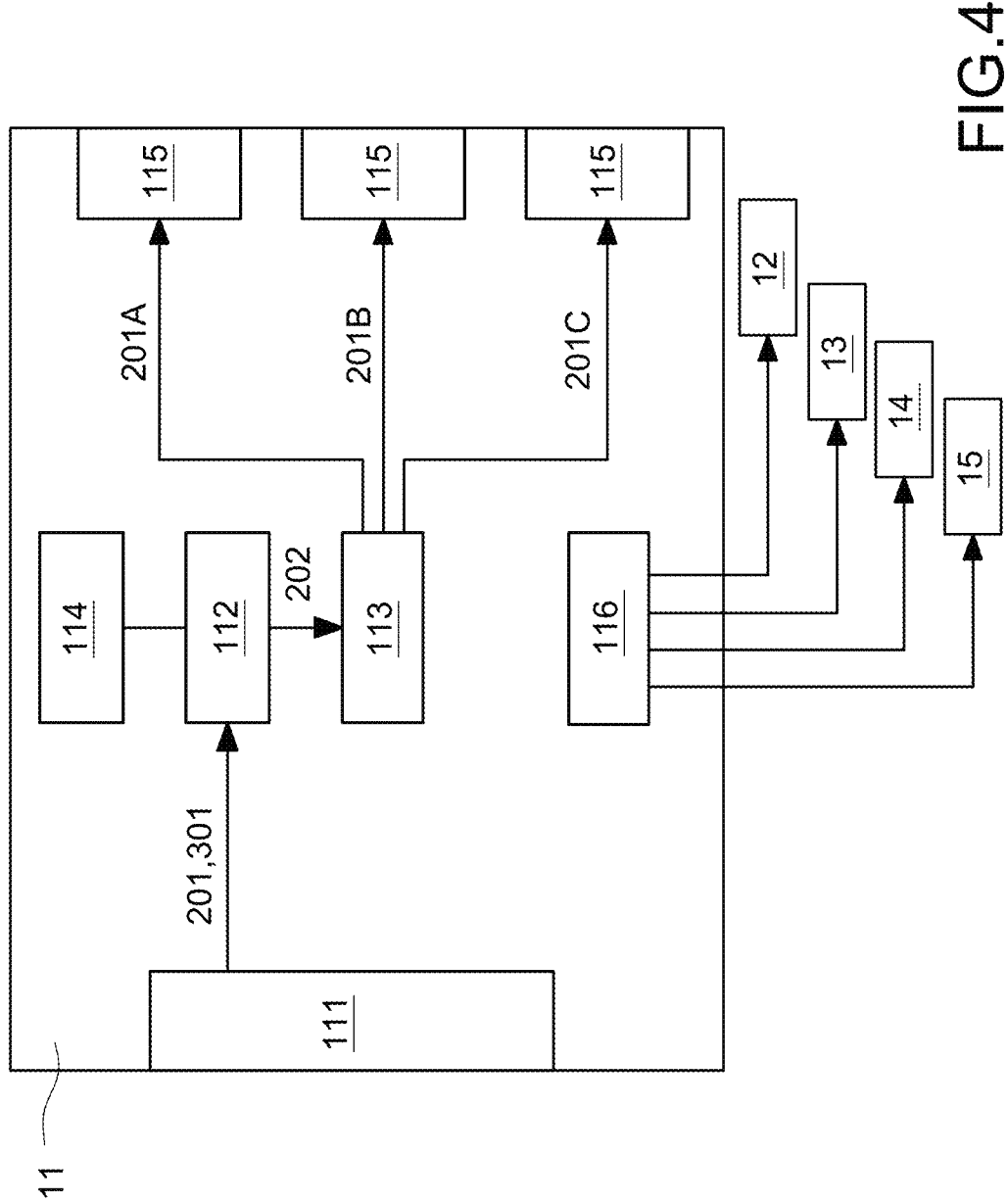
FIG. 4 is the schematic diagram of one embodiment of the processing control unit of the disclosure.

FIG. 4 is the schematic diagram of one embodiment of the processing control unit 11 of the disclosure. As shown in FIG. 4, in some embodiments, the processing control unit 11, for example, may include an image signal input port 111, a sub-frame processing portion 112, a color management portion 113, a memory buffer portion 114, and a plurality of output ports 115, here is not intended to be limiting. The image signal input port 111 receives the first output image signal 201 in the first mode, and receives the second output image signal 301 in the second mode.

The sub-frame processing portion 112 is electrically connected with the image signal input port 111 and the memory buffer portion 114, receives the first output image signal 201 or the second output image signal 301, and outputs a sub-output image signal 202. The sub-frame processing portion 112 and the memory buffer portion 114 may perform signal processing and buffer storing, for example, the processing as in FIG. 1C, to divide the 8 K resolution image signal into four 4 K resolution sub-output image signals in a 2×2 pixels four-division manner. In some embodiments, the resolution of the sub-output image signal 202 is less than the resolution of the first output image signal 201 or the second output image signal 301.

The color management portion 113 is electrically connected with the sub-frame processing portion 112, receives the sub-output image signal 202, and outputs the first color image signal 201A, the second color image signal 201B, and the third color image signal 201C. In other words, the color management portion 113 may perform the color management (for example, color saturation, hue, gamut adjustments, color space conversion, etc.) of the projection display device 1 and then separate three fundamental color image signals of first color, second color, and third color (such as, red, green, blue), and output to the display imaging unit in the later stage.

In some embodiments, the processing control unit 11 may include a system control portion 116. The system control portion 116 is electrically connected with the projection light source 14, the display imaging unit 12, and the shifting unit 13, and controls the display imaging unit 12 and the shifting unit 13. The system control portion 116, for example, may control actions of the projection light source 14, the display imaging unit 12, and the shifting unit 13 to generate high-resolution projection display on the projection screen. The system control portion 116 may also be electrically connected with the stereo video synchronous signal unit 15. Thus, when the stereoscopic vision projection image is being outputted, the system control portion 116 may control the stereo video synchronous signal unit 15 to output the stereo video synchronous signal to an external stereoscopic glasses transmitting processor (not shown in figures). The stereoscopic glasses transmitting processor may, for example, transmit stereo video synchronous signal to the stereoscopic glasses (not shown in figures) through wireless signal (such as radio frequency (RF) signal or infrared (IR) signal) manner.

Referring back to FIG. 2, the display imaging unit 12 receives the first color image signal 201A, the second color image signal 201B, and the third color image signal 201C and generates the display image. The display image may be transformed into the first projection image 203 (corresponding to the first mode) or the second projection image 302 (corresponding to the second mode) through the projection light source. In other words, the light L projected by the projection light source passes through the display imaging unit 12 to transform the display image into the first projection image 203 or the second projection image 302.

In some embodiments, the display imaging unit 12 may, for example, include a first color controller 121, a first color micromirror display device 122, a second color controller 123, a second color micromirror display device 124, a third color controller 125, and a third color micromirror display device 126. The first color controller 121 and the first color micromirror display device 122 is corresponding to the first color image signal 201A, the second color controller 123 and the second color micromirror display device 124 is corresponding to the second color image signal 201B, and the third color controller 125 and the third color micromirror display device 126 is corresponding to the third color image signal 201C.

In other words, the color controllers 121, 123, 125 are in charge of the display processing of single fundamental color, respectively. The color controllers 121, 123, 125 may, for example, receive 4 K240 Hz image signal. After processing the image signals, the color controllers 121, 123, 125 may output that to drive the color micromirror display devices 122, 124, 126.

The color micromirror display devices 122, 124, 126 may, for example, use 4 K resolution digital micromirror device (DMD). Each of the color micromirror display devices 122, 124, 126 includes, for example, a reflector matrix structured by a plurality of reflectors. Each reflector may deflect in very high-speed, and the deflection angle has two states, which represent the instantaneous brightness and darkness of each pixel in the picture. The time proportion of brightness and darkness decides the luminance of each pixel in the picture. The color micromirror display devices 122, 124, 126 project the display image to the projection light path through the light emitted from the projection light source 14 and the other optical elements (not shown in figures). The projection image 203, 302 outputted by the color micromirror display devices 122, 124, 126 passes through the shifting unit 13 and the projection lens 16 to be projected on the projection screen.

The shifting unit 13 cooperates with the display imaging unit 12 to increase the resolution (such as, increasing from 4 K to 8 K) of the projection image 203, 302 outputted by the display imaging unit 12, and projects the projection image 203, 302 outputted from the color micromirror display devices 122, 124, 126 on the projection screen through the projection lens 16. As a result, the projection display device 1, which may have lower original resolution, may display high-resolution projection image. In some embodiments, the resolution of the first projection image 203 is the same with the resolution of the second projection image 302.

In other words, even the resolution of the input image signal is low, the projection image may still have high resolution. Specifically, the shifting unit 13, for example, may be linked with the color micromirror display devices 122, 124, 126. For example, the shifting unit 13 may be a lens having two sets of voice coil motor. One set of voice coil motor is used to shift the projection image outputted from the color micromirror display devices 122, 124, 126 by half-pixel distance along a first axis, for example, moving up-down along vertical axis. The other set of voice coil motor is used to shift the projection image outputted from the color micromirror display devices 122, 124, 126 by half-pixel distance along a second axis, for example, moving left-right along horizontal axis.

Next, the control of the projection display device with respect to different types of image signals is described as below.

Referring to FIG. 1A and FIG. 2, with respect to the 8 K resolution single image signal (type A), the receiving unit 10 receives single input image signal 200 with 8 K resolution (the highest frame rate may be, for example, 60 Hz), performs image signal format processing and adjustment correspondingly (for example, scaling process for resolution if required, aspect ratio adjustment, converting frame rate, image quality adjustment, etc.), and output the processed output image signal 201 to the processing control unit 11. The sub-frame processing portion 112 (as shown in FIG. 4) of the processing control unit 11 may, for example, perform signal processing and buffer storing, for example, the processing as in FIG. 1C, to divide the 8 K resolution image signal into four 4 K resolution sub-output image signals in a 2×2 pixels four-division manner. The color management portion 113 (as shown in FIG. 4) of processing control unit 11 may perform the color management (for example, color saturation, hue, gamut adjustments, color space conversion, etc.) of the projection display device 1 and then separate three fundamental color image signals (such as 4 K resolution and 240 Hz frame rate) of first color, second color, and third color (such as, red, green, blue), and output to the display imaging unit 12 in the later stage. Further, the system control portion 116 (as shown in FIG. 4) of the processing control unit 11, for example, may control actions of the projection light source 14, the display imaging unit 12, and the shifting unit 13 to generate high-resolution (for example, 8 K resolution) projection display on the projection screen.

Referring to FIG. 1B and FIG. 2, with respect to the 8 K resolution of four square-division image signal (type B), the receiving unit 10 receives four input image signals 300 in the four square-division manner through a plurality of image signal input modules 101 (as shown in FIG. 3), and combines the received four input image signals 300 in the square-division manner into one 8 K resolution image signal through the image signal processing portion 103 and the memory buffer portion 104 (as shown in FIG. 3). The sub-frame processing portion 112 (as shown in FIG. 4) of the processing control unit 11 may, for example, perform signal processing and buffer storing, for example, the processing as in FIG. 1C, to divide the 8 K resolution image signal into four 4 K resolution sub-output image signals in a 2×2 pixels four-division manner. The color management portion 113 (as shown in FIG. 4) of the processing control unit 11 may perform the color management (for example, color saturation, hue, gamut adjustments, color space conversion, etc.) of the projection display device 1 and then separate three fundamental color image signals (such as 4 K resolution and 240 Hz frame rate) of first color, second color, and third color (such as, red, green, blue), and output to the display imaging unit 12 in the later stage. Further, the system control portion 116 (as shown in FIG. 4) of the processing control unit 11, for example, may control actions of the projection light source 14, the display imaging unit 12, and the shifting unit 13 to generate high-resolution (for example, 8 K resolution) projection display on the projection screen.

Referring to FIG. 1C and FIG. 2, with respect to the 8 K resolution 2×2 pixels four-division image signal (type C), the receiving unit 10 receives four input image signals 300 in the 2×2 pixels four-division manner through a plurality of image signal input modules 101 (as shown in FIG. 3), and output the 4 K resolution image signals 300 in a four-division manner to the processing control unit 11 without performing signal processing. On the other hand, the function of the sub-frame processing portion 112 (as shown in FIG. 4) of the processing control unit 11 may be bypassed. Then, the color management portion 113 (as shown in FIG. 4) of processing control unit 11 may perform the color management (for example, color saturation, hue, gamut adjustments, color space conversion, etc.) of the projection display device 1 and then separate three fundamental color image signals (such as 4 K resolution and 240 Hz frame rate) of first color, second color, and third color (such as, red, green, blue), and output to the display imaging unit 12 in the later stage. Further, the system control portion 116 (as shown in FIG. 4) of the processing control unit 11, for example, may control actions of the projection light source 14, the display imaging unit 12, and the shifting unit 13 to generate high-resolution (for example, 8 K resolution) projection display on the projection screen.

Figure 5:
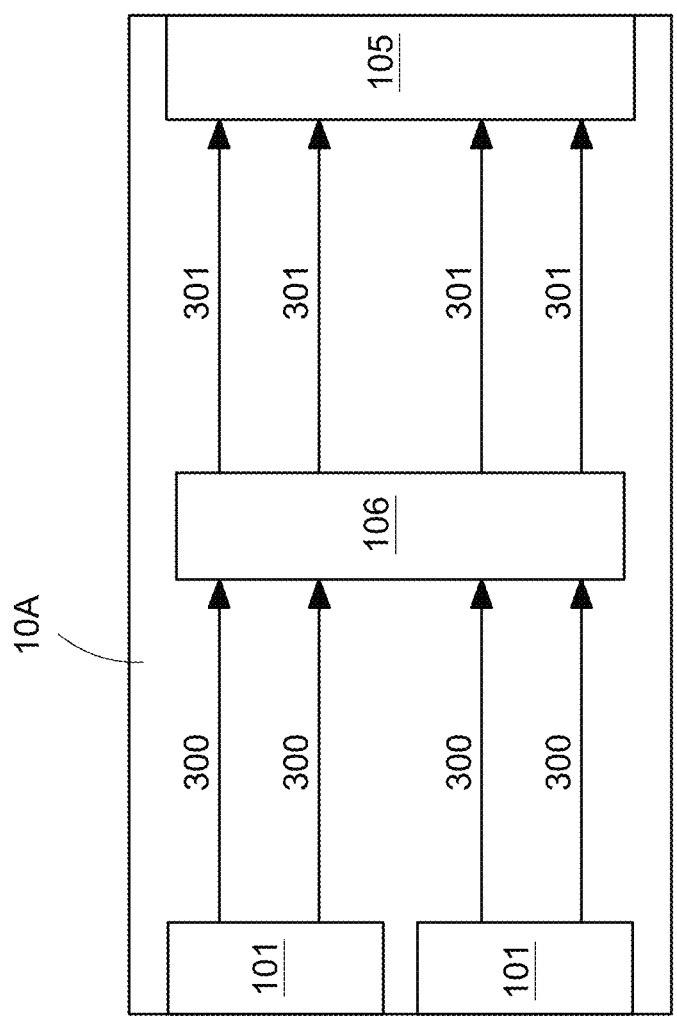
FIG. 5 is the schematic diagram of one variant embodiment of the receiving unit of the disclosure.

FIG. 5 is the schematic diagram of one variant embodiment of the receiving unit 10A of the disclosure. It is worth mentioning that, with respect to the 8 K resolution 2×2 pixels four-division image signal, the receiving unit 10A may only include a buffer and regenerator 106 for receiving four input image signals 300 in the 2×2 pixels four-division manner and outputting that to the processing control unit 11. Similarly, the function of the sub-frame processing portion 112 (as shown in FIG. 4) of the processing control unit 11 may be bypassed.

On the other hand, referring to FIG. 2, with respect to the 4 K resolution 240 Hz image signal (type F), the receiving unit 10 receives single input image signal 200 with 4 K resolution and 240 Hz frame rate, performs image signal format processing and adjustment correspondingly (for example, scaling process for resolution, converting frame rate, image quality adjustment, etc.), and output the processed output image signal 201 to the processing control unit 11. The function of the sub-frame processing portion 112 (as shown in FIG. 4) of the processing control unit 11 may be bypassed without performing the process of 2×2 pixels four-division. The color management portion 113 (as shown in FIG. 4) of processing control unit 11 may perform the color management (for example, color saturation, hue, gamut adjustments, color space conversion, etc.) of the projection display device 1 and then separate three fundamental color image signals (such as 4 K resolution and 240 Hz frame rate) of first color, second color, and third color (such as, red, green, blue), and output to the display imaging unit 12 in the later stage. Further, the system control portion 116 (as shown in FIG. 4) of the processing control unit 11, for example, may control actions of the projection light source 14 and the display imaging unit 12 (the shifting unit 13 is non-action) to generate high frame rate (4 K240 Hz) projection display on the projection screen.

Figure 6:
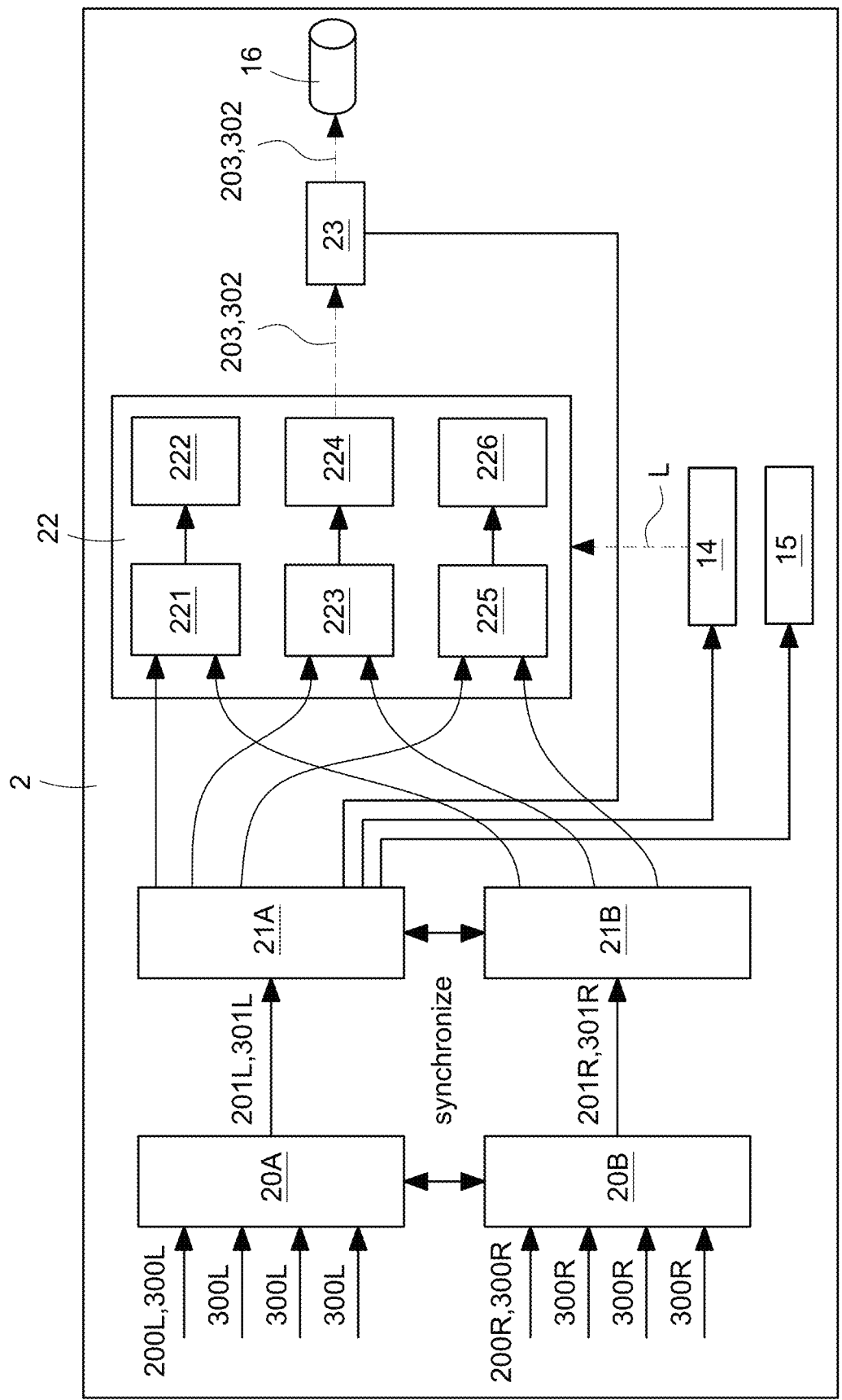
FIG. 6 is the schematic diagram of the second embodiment of a projection display device of the disclosure.

FIG. 6 is the schematic diagram of the second embodiment of a projection display device 2 of the disclosure. The difference between the projection display device 2 in the second embodiment and the projection display device 1 in the first embodiment is that the projection display device 2 includes a plurality of receiving units 20A, 20B and a plurality of processing control units 21A, 21B. The structures and actions of each receiving unit 20A, 20B, each processing control unit 21A, 21B, the display imaging unit 22, and the shifting unit 23 are similar to the structures and actions of the receiving unit 10, the processing control unit 11, the display imaging unit 12, and the shifting unit 13, the description is omitted here for brevity. Specifically, the receiving units 20A, 20B and the processing control units 21A, 21B in the embodiment may be modularized plugboard design, and may be applied by one set, two sets, or more than two sets according to practical requirement. In the embodiment, two receiving units 20A, 20B and two processing control units 21A, 21B are used as an example, here is not intended to be limiting. In the embodiment, output image signals of 20A and 20B are synchronized via a synchronous signal between 20A and 20B. For example, with respect to the 8 K resolution 120 Hz stereoscopic vision image signal (type D), two receiving units 20A, 20B respectively receive the left-eye image signal 200L and the right-eye image signal 200R corresponding to 8 K resolution stereoscopic vision. Two receiving units 20A, 20B process corresponding to the aforementioned manner of 8 K single signal, and output 8 K60 Hz output image signal 201L, 201R to two processing control units 21A, 21B, respectively.

On the other hand, the manner of using one receiving unit 20A to receive four left-eye image signals 300L in the square-division manner corresponding to 8 K resolution stereoscopic vision and using the other receiving unit 20B to receive four right-eye image signals 300R in the square-division manner corresponding to 8 K resolution stereoscopic vision may also be applicable. Two receiving units 20A, 20B respectively combine the left-eye or right-eye image signals 300L, 300R in the four-division manner into one 8 K resolution left-eye or right-eye image signal, and output that to two processing control units 21A, 21B, respectively.

The sub-frame processing portion 112 (as shown in FIG. 4) of each processing control unit 21A, 21B may, for example, perform signal processing and buffer storing, for example, the processing as in FIG. 1C, to divide the 8 K resolution image signal into four 4 K resolution sub-output image signals in a 2×2 pixels four-division manner. In other words, the left-eye and right-eye image signals with 8 K resolution 60 Hz frame rate are respectively transformed into four sub-image signals (that is, four sub-left-eye image signals and four sub-right-eye image signals) with 4 K resolution 240 Hz frame rate. Similarly, the color management portion 113 (as shown in FIG. 4) of each processing control unit 21A, 21B may perform the color management (for example, color saturation, hue, gamut adjustments, color space conversion, etc.) of the projection display device 2 and then separate three fundamental color image signals (such as 4 K resolution and 240 Hz frame rate) of first color, second color, and third color (such as, red, green, blue), and output to the display imaging unit 22 in the later stage. Then, one set of image signal receiving interface of each of the three color controllers 221, 223, 225 receives the 4 K240 Hz image signals of three fundamental colors (defined as the left-eye image signal of stereoscopic vision) separated by each processing control unit 21A, 21B, and the other set of image signal receiving interface of each of the three color controllers 221, 223, 225 receives the 4 K240 Hz image signals of three fundamental colors (defined as the right-eye image signal of stereoscopic vision) separated by each processing control unit 21A, 21B at the same time.

The three color controllers 221, 223, 225 simultaneously receive the left-eye image signal and the right-eye image signal of stereoscopic vision, and output 4 K480 Hz image signal after processing to drive and display in three color micromirror display devices 222, 224, 226. The system control portion 116 (as shown in FIG. 4) of one of the processing control units 21A, 21B, for example, may control actions of the projection light source 14, the display imaging unit 22, and the shifting unit 23 to generate 8 K resolution projection display of stereoscopic vision on the projection screen. Further, the system control portion 116 is electrically connected with the stereo video synchronous signal unit 15. As a result, when outputting the projection display of stereoscopic vision, the system control portion 116 may control the stereo video synchronous signal unit 15 to output the stereo video synchronous signal to an external stereoscopic glasses transmitting processor (not shown in figures). The stereoscopic glasses transmitting processor may, for example, transmit the stereo video synchronous signal to the stereoscopic glasses (not shown in figures) through wireless signal (such as RF signal or IR signal) manner.

Figure 7:
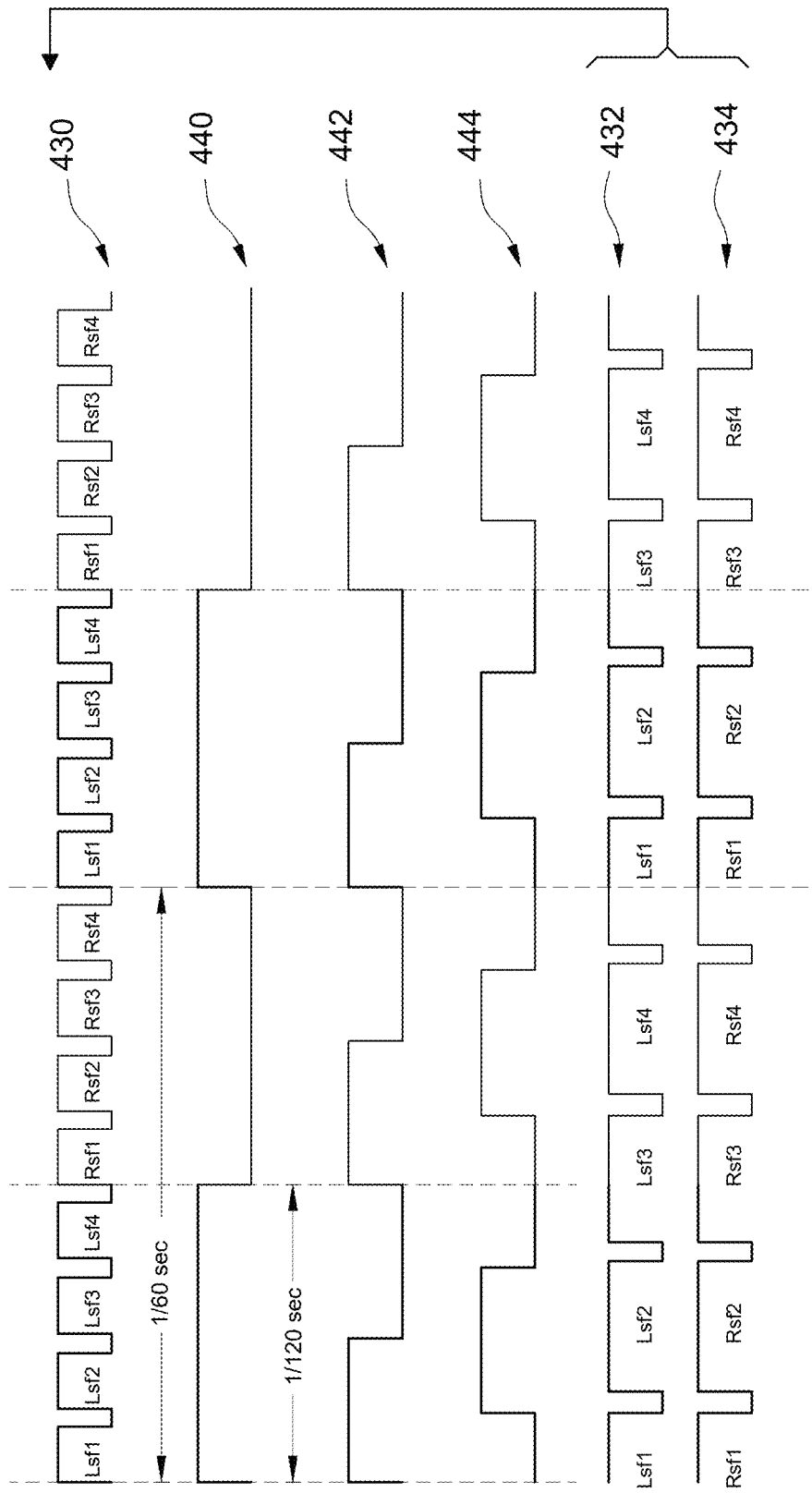
FIG. 7 is the timing diagram of the stereoscopic vision image signal with 8 K resolution and 120 Hz frame rate.

FIG. 7 is the timing diagram of the stereoscopic vision image signal with 8 K resolution and 120 Hz frame rate. As shown in FIG. 7, the two processing control unit 21A, 21B and the color controllers 221, 223, 225 (as shown in FIG. 6) may transform the image signal into the stereoscopic vision image signal. For example, the left-eye image signal of stereoscopic vision with 8 K resolution is transformed to be timing 432, and the right-eye image signal of stereoscopic vision with 8 K resolution is transformed to be timing 434. The color controllers 221, 223, 225 further transform the left-eye and right-eye image signals of stereoscopic vision with 8 K resolution into timing 430, and the frame rate is doubled to be 480 Hz. Then, the system control portion 116 (as shown in FIG. 4) of one of the two processing control unit 21A, 21B generates two synchronous signal 442, 444 (corresponding to vertical direction and horizontal direction) to control four-phased shifting unit 23 to do projection image shift of half pixel in four phases, combines the left-eye image signal Lsf1, Lsf2, Lsf3, Lsf4 into one 8 K resolution left-eye image, and combines the right-eye image signal Rsf1, Rsf2, Rsf3, Rsf4 into one 8 K resolution right-eye image. The projection display device 2 controls the stereo video synchronous signal unit 15 through the system control portion 116 to output the stereo video synchronous signal with the timing 440 to an external stereoscopic glasses transmitting processor (not shown in figures). The stereoscopic glasses transmitting processor may, for example, transmit stereo video synchronous signal to the stereoscopic glasses (not shown in figures) through wireless signal (such as radio frequency (RF) signal or infrared (IR) signal) manner. The viewer may watch 8 K120 Hz stereoscopic vision image after wearing the stereoscopic glasses.

Further, referring to FIG. 6, with respect to the 4 K resolution 120 Hz stereoscopic vision image signal for multi-viewer (type E), for example, eight input image signals corresponding to the left-right-eye images of stereoscopic vision for the perspectives of four viewers are used as an example, here is not intended to be limiting. Specifically, eight input image signals 300L, 300R are grouped by two in each group and inputted to two receiving unit 20A, 20B of the projection display device 2. The eight input image signals 300L, 300R are corresponding to four sets of left-eye image and right-eye image for four viewers with 4 K resolution and 60 Hz frame rate. The input image signals 300L, 300R are corresponding to the left-eye image and the right-eye image, respectively.

Figure 8B:
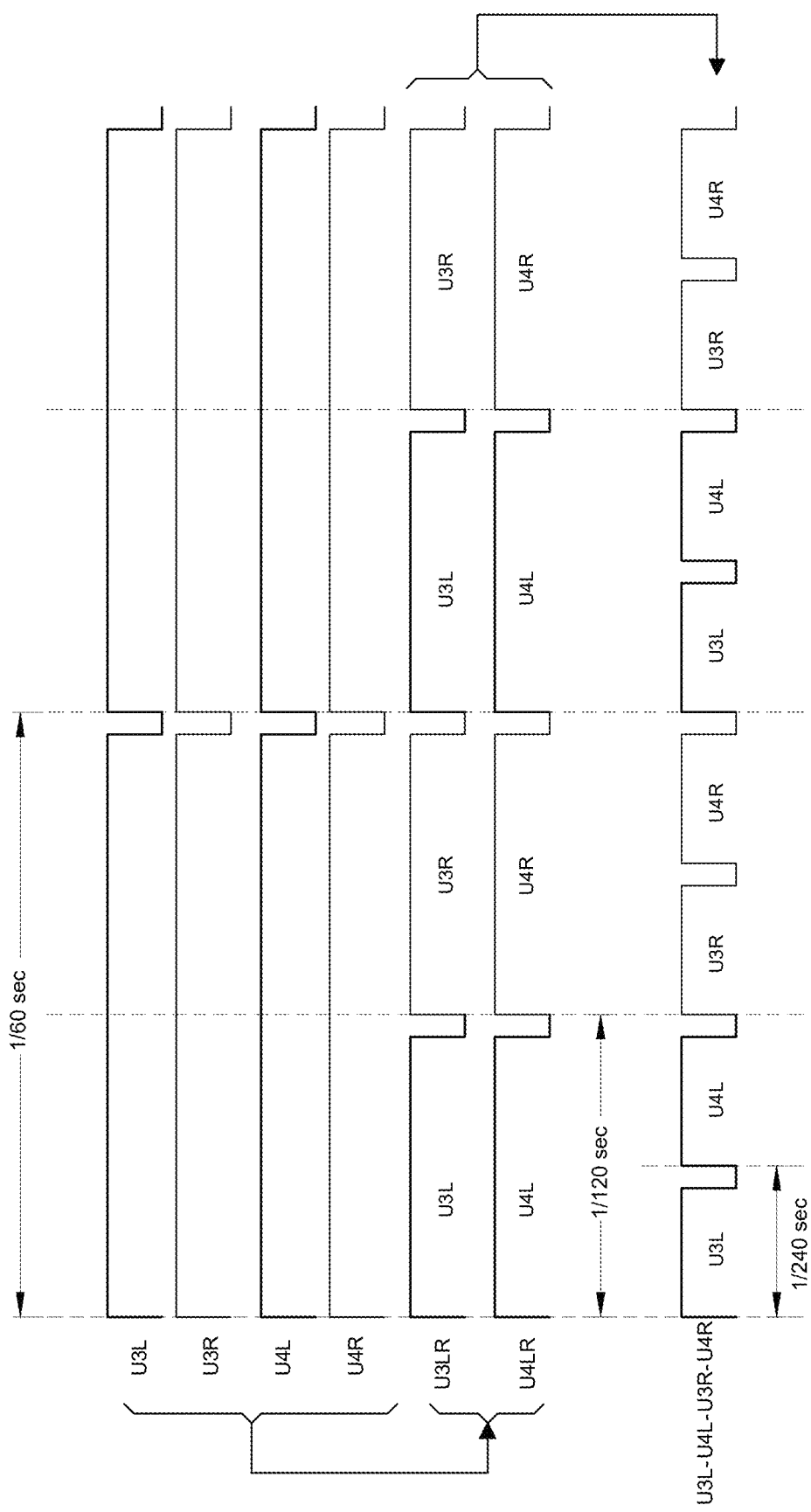

FIG. 8A to FIG. 8D are the timing transforming diagrams of the stereoscopic vision image signal with 4 K resolution and 120 Hz frame rate for multi-viewer. First, as shown in FIG. 6 and FIG. 8A, the receiving unit 20A receives four 4 K60 Hz input image signals 300L with timing U1L, U1R, U2L, U2R, and outputs 4 K240 Hz output image signal 301L to the processing control unit 21A after the timing processing as shown in FIG. 8A. That is, the output image signal 301L processed by the receiving unit 20A has the output timing U1L-U2L-U1R-U2R, and the frame rate is increased to 240 Hz. It is worth mentioning that timing U1L indicates the left eye of the first viewer, timing U2L indicates the left eye of the second viewer, timing U1R indicates the right eye of the first viewer, and timing U2R indicates the right eye of the second viewer.

The processing control unit 21A receives the output image signal 301L with the timing U1L-U2L-U1R-U2R to separate three fundamental color image signals of first color, second color, and third color (such as, red, green, blue), and outputs to the display imaging unit 22 in the later stage.

As shown in FIG. 6 and FIG. 8B, the receiving unit 20B receives four 4 K60 Hz input image signals 300R with timing U3L, U3R, U3L, U3R, and outputs 4 K240 Hz output image signal 301R to the processing control unit 21B after the timing processing as shown in FIG. 8B. That is, the output image signal 301 processed by the receiving unit 20B has the output timing U3L-U4L-U3R-U4R, and the vertical frame rate is increased to 240 Hz. It is worth mentioning that timing U3L indicates the left eye of the third viewer, timing U4L indicates the left eye of the fourth viewer, timing U3R indicates the right eye of the third viewer, and timing U4R indicates the right eye of the fourth viewer.

The processing control unit 21B receives the output image signal 301R with the timing U3L-U4L-U3R-U4R to separate three fundamental color image signals of first color, second color, and third color (such as, red, green, blue), and outputs to the display imaging unit 22 in the later stage.

Figure 8C:
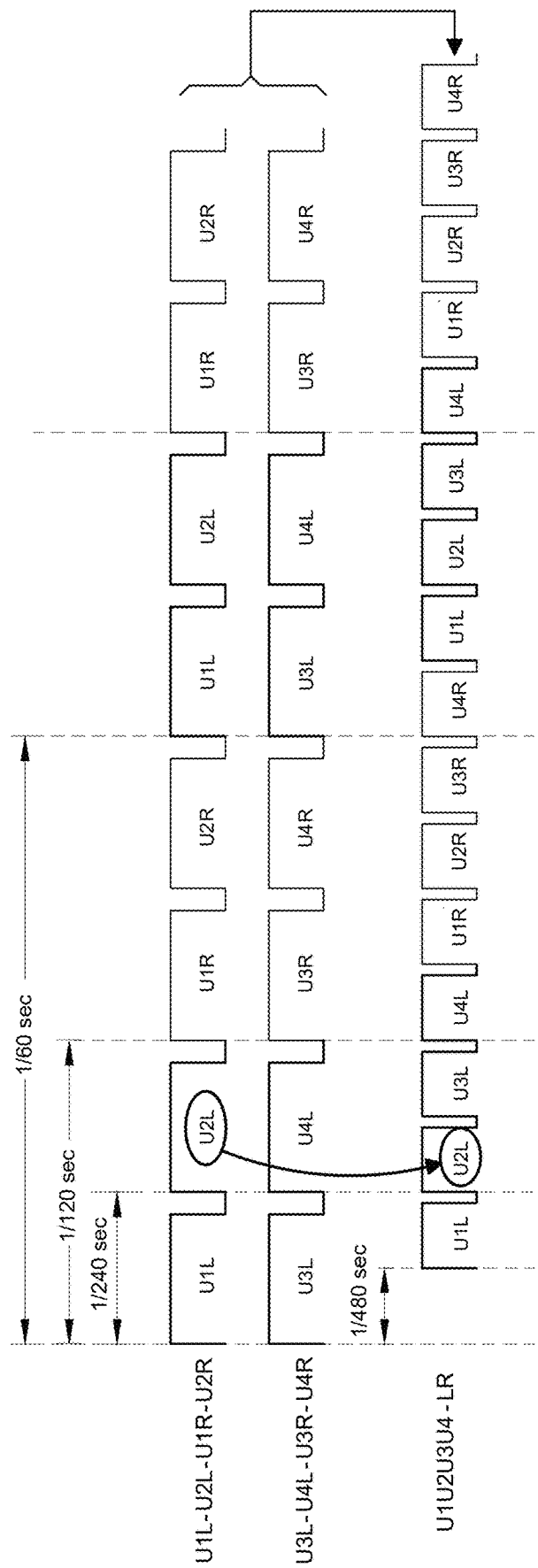

Then, as shown in FIG. 6 and FIG. 8C, each monochromatic color controller 221, 223, 225 simultaneously receives monochromatic image signals with timing U1L-U2L-U1R-U2R and timing U3L-U4L-U3R-U4R through receiving two 4 K240 Hz image signals to perform timing transformation. That is, the two inputted 4 K240 Hz image signals are transformed into 4 K480 Hz image signal with timing U1U2U3U4-LR. The transformed image signal is delayed ¹⁄₄₈₀ seconds from the inputted image signal. The reason is that the timing U2L cannot be earlier than inputted timing.

Figure 8D:
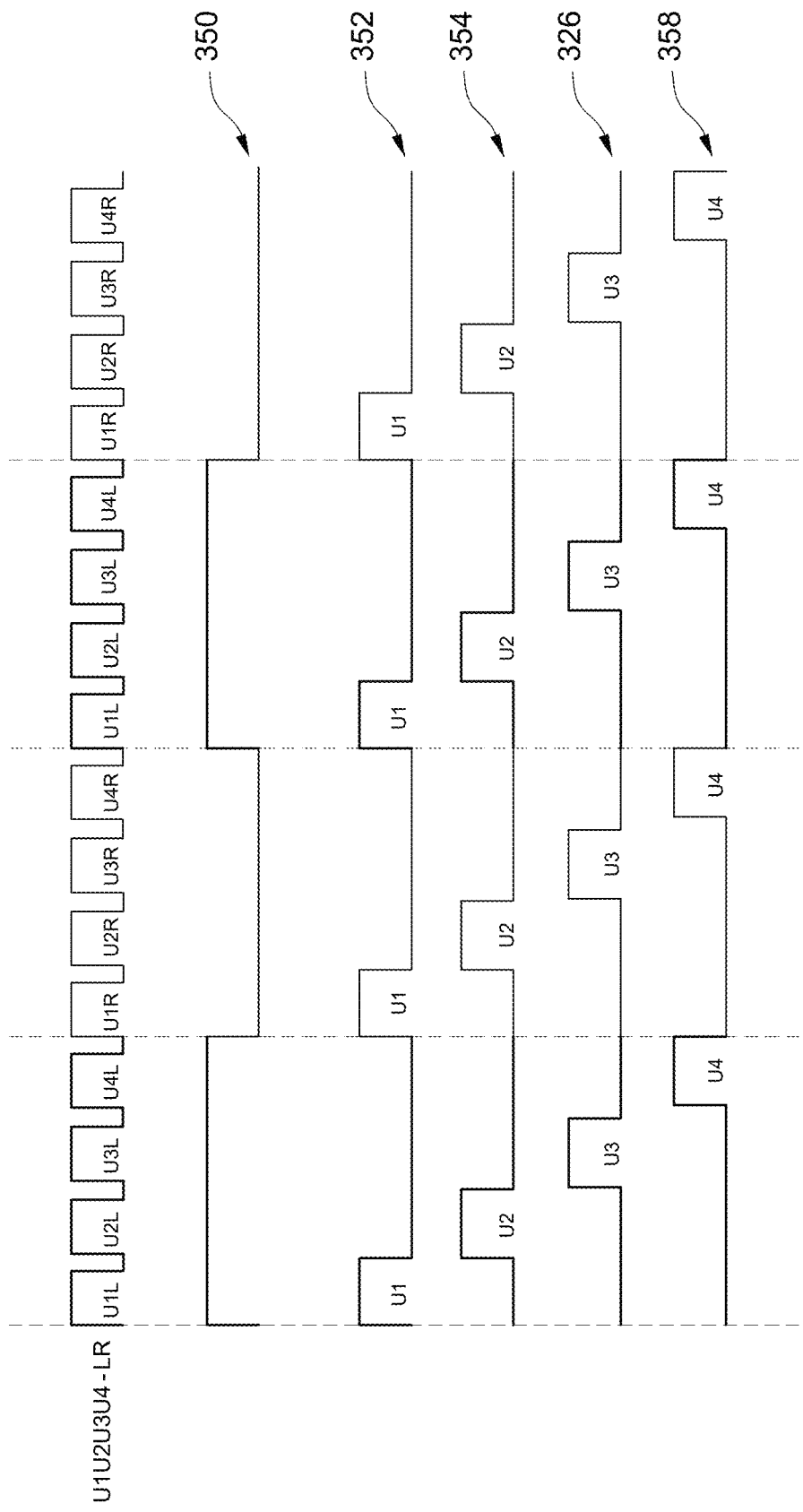

As shown in FIG. 6 and FIG. 8D, the timing 350 of the stereo video synchronous signal with 60 Hz frequency for the stereoscopic glasses needs to be synchronously outputted with the 4 K480 Hz image signal with the timing U1U2U3U4-LR. Both are controlled and outputted by the system control portion 116 (as shown in FIG. 4) of the processing control unit 21A. Thus, after the internal processing of the projection display device 2, the projection display is outputted based on the timing U1U2U3U4-LR (that is, 480 Hz first viewer left eye-second viewer left eye-third viewer left eye-fourth viewer left eye-first viewer right eye-second viewer right eye-third viewer right eye-fourth viewer right eye) to be corresponding to the left-eye and right-eye picture of stereoscopic vision for the perspectives of four viewers. The projection display device 2 simultaneously outputs the stereo video synchronous signal with the timing 350 to the stereoscopic glasses transmitting processor to transmit stereo video synchronous signal to four stereoscopic glasses of four viewers with different perspectives through wireless signal manner. The four viewers wearing different stereoscopic glasses may see the stereoscopic vision pictures of four different perspectives based on the timing 352, 354, 356, 358.

It is worth mentioning that, in the projection display device 2, if there are only two viewers, one set of receiving unit and processing control unit may only be used. On the other hand, if there are more than four viewers, three or more three sets of receiving unit and processing control unit may be used.

In summary, the projection display device of the disclosure may be used corresponding to multiple types of often used image signals with high resolution (8 K/4 K) and high frame rate. The arrangement with more flexibility and better cost performance ratio may be provided by the design of modularizing the receiving unit and the processing control unit. As a result, the disclosure may provide the projection display device, which may have simpler system and lower cost, and may be satisfied for different applications with high resolution and high frame rate. Further, the receiving unit and the processing control unit of the projection display device of the disclosure may be modularized plugboard design, and may be applied by one set, two sets, or more than two sets according to practical requirement.

While this disclosure has been described by means of specific embodiments, numerous modifications and variations may be made thereto by those skilled in the art without departing from the scope and spirit of this disclosure set forth in the claims.

What is claimed is:

1. A projection display device, comprising:
   a receiving unit;
   a processing control unit, electrically connected with the receiving unit;
   a display imaging unit, electrically connected with the processing control unit, and configured to generate a display image;
   a projection light source, electrically connected with the processing control unit; and
   a shifting unit, electrically connected with the processing control unit,
   wherein, in a first mode, the receiving unit is configured to receive one first input image signal and output a first output image signal, the processing control unit is configured to receive the first output image signal and output a first color image signal, a second color image signal, and a third color image signal, the display imaging unit is configured to receive the first color image signal, the second color image signal, and the third color image signal to generate the display image, the display image is transformed to a first projection image through the projection light source, the shifting unit is configured to shift the first projection image based on a control timing and project the first projection image to a projection screen to increase a resolution of the first projection image, and
   in a second mode, the receiving unit is configured to receive a plurality of second input image signals and output a second output image signal, the processing control unit is configured to receive the second output image signal and output the first color image signal, the second color image signal, and the third color image signal, the display imaging unit is configured to receive the first color image signal, the second color image signal, and the third color image signal to generate the display image, the display image is transformed to a second projection image through the projection light source, the shifting unit is configured to shift the second projection image based on the control timing and project the second projection image to the projection screen to increase a resolution of the second projection image;

wherein a resolution and a refresh rate of the first input image signal are greater than a resolution and a refresh rate of each of the second input image signals, and the first input image signal being received in the first mode has a highest resolution or a highest frame rate.

2. The projection display device according to claim 1, wherein, after passing the shifting unit, the resolution of the first projection image is same as the resolution of the second projection image.

3. The projection display device according to claim 1, wherein the receiving unit comprises:
a plurality of image signal input modules, configured to receive the first input image signal in the first mode, and configured to receive the second input image signals in the second mode;
an image signal switching portion, electrically connected with the image signal input modules, and configured to receive the first input image signal or the second input image signals; and
an image signal processing portion, electrically connected with the image signal switching portion, and configured to receive the first input image signal or the second input image signals and output the first output image signal or the second output image signal.

4. The projection display device according to claim 3, wherein, when the image signal processing portion receives the second input image signals, the image signal processing portion is configured to combine the second input image signals to the second output image signal, and a resolution of the first output image signal is same as a resolution of the second output image signal.

5. The projection display device according to claim 1, wherein the processing control unit comprises:
an image signal input port, configured to receive the first output image signal in the first mode, and configured to receive the second output image signal in the second mode;
a sub-frame processing portion, electrically connected with the image signal input port, and configured to receive the first output image signal or the second output image signal and output a sub-output image signal; and
a color management portion, electrically connected with sub-frame processing portion, and configured to receive the sub-output image signal and output the first color image signal, the second color image signal, and the third color image signal.

6. The projection display device according to claim 5, wherein a resolution of the sub-output image signal is less than a resolution of the first output image signal or a resolution of the second output image signal.

7. The projection display device according to claim 1, wherein the processing control unit further comprises:
a system control portion, electrically connected with and configured to control the display imaging unit and the shifting unit.

8. The projection display device according to claim 7, wherein, in the first mode, the system control portion is configured to receive the first output image signal and output a stereo video synchronous signal, wherein, in the second mode, the system control portion is configured to receive the second output image signal and output the stereo video synchronous signal.

9. A projection display device, comprising:
a plurality of receiving units;
a plurality of processing control units, electrically connected with the receiving units, respectively;
a display imaging unit, electrically connected with the processing control units, and configured to generate a display image;
a projection light source, electrically connected with the processing control units; and
a shifting unit, electrically connected with the processing control units,
wherein, in a first mode, each receiving unit is configured to receive one first input image signal and output a first output image signal, each processing control unit is configured to receive the first output image signal and output a first color image signal, a second color image signal, and a third color image signal, the display imaging unit is configured to receive the first color image signal, the second color image signal, and the third color image signal to generate the display image, the display image is transformed to a first projection image through the projection light source, the shifting unit is configured to shift the first projection image based on a control timing and project the first projection image to a projection screen to increase a resolution of the first projection image, and
in a second mode, each receiving unit is configured to receive a plurality of second input image signals and output a second output image signal, each processing control unit is configured to receive the second output image signal and output the first color image signal, the second color image signal, and the third color image signal, the display imaging unit is configured to receive the first color image signal, the second color image signal, and the third color image signal to generate the display image, the display image is transformed to a second projection image through the projection light source, the shifting unit is configured to shift the second projection image based on the control timing and project the second projection image to the projection screen to increase a resolution of the second projection image;
wherein a resolution and a refresh rate of the first input image signal are greater than a resolution and a refresh rate of each of the second input image signals, and the first input image signal being received in the first mode has a highest resolution or a highest frame rate.

10. The projection display device according to claim 9, wherein, after passing the shifting unit, the resolution of the first projection image is same as the resolution of the second projection image.

11. The projection display device according to claim 9, wherein each receiving unit comprises:
a plurality of image signal input modules, configured to receive the first input image signal in the first mode, and configured to receive the second input image signals in the second mode;
an image signal switching portion, electrically connected with the image signal input modules, and configured to receive the first input image signal or the second input image signals; and
an image signal processing portion, electrically connected with the image signal switching portion, and configured to receive the first input image signal or the second input image signals and output the first output image signal or the second output image signal.

12. The projection display device according to claim 11, wherein, when the image signal processing portion receives the second input image signals, the image signal processing portion is configured to combine the second input image signals to the second output image signal, and a resolution of the first output image signal is same as a resolution of the second output image signal.

13. The projection display device according to claim 9, wherein each processing control unit comprises:
   an image signal input port, configured to receive the first output image signal in the first mode, and configured to receive the second output image signal in the second mode;
   a sub-frame processing portion, electrically connected with the image signal input port, and configured to receive the first output image signal or the second output image signal and output a sub-output image signal; and
   a color management portion, electrically connected with sub-frame processing portion, and configured to receive the sub-output image signal and output the first color image signal, the second color image signal, and the third color image signal.

14. The projection display device according to claim 9, wherein each processing control unit further comprises:
   a system control portion, electrically connected with and configured to control the display imaging unit and the shifting unit.

15. The projection display device according to claim 14, wherein, in the first mode, the system control portion is configured to receive the first output image signal and output a stereo video synchronous signal, and in the second mode, the system control portion is configured to receive the second output image signal and output the stereo video synchronous signal.

16. The projection display device according to claim 13, wherein a resolution of the sub-output image signal is less than a resolution of the first output image signal or a resolution of the second output image signal.

* * * * *